Figure 1:
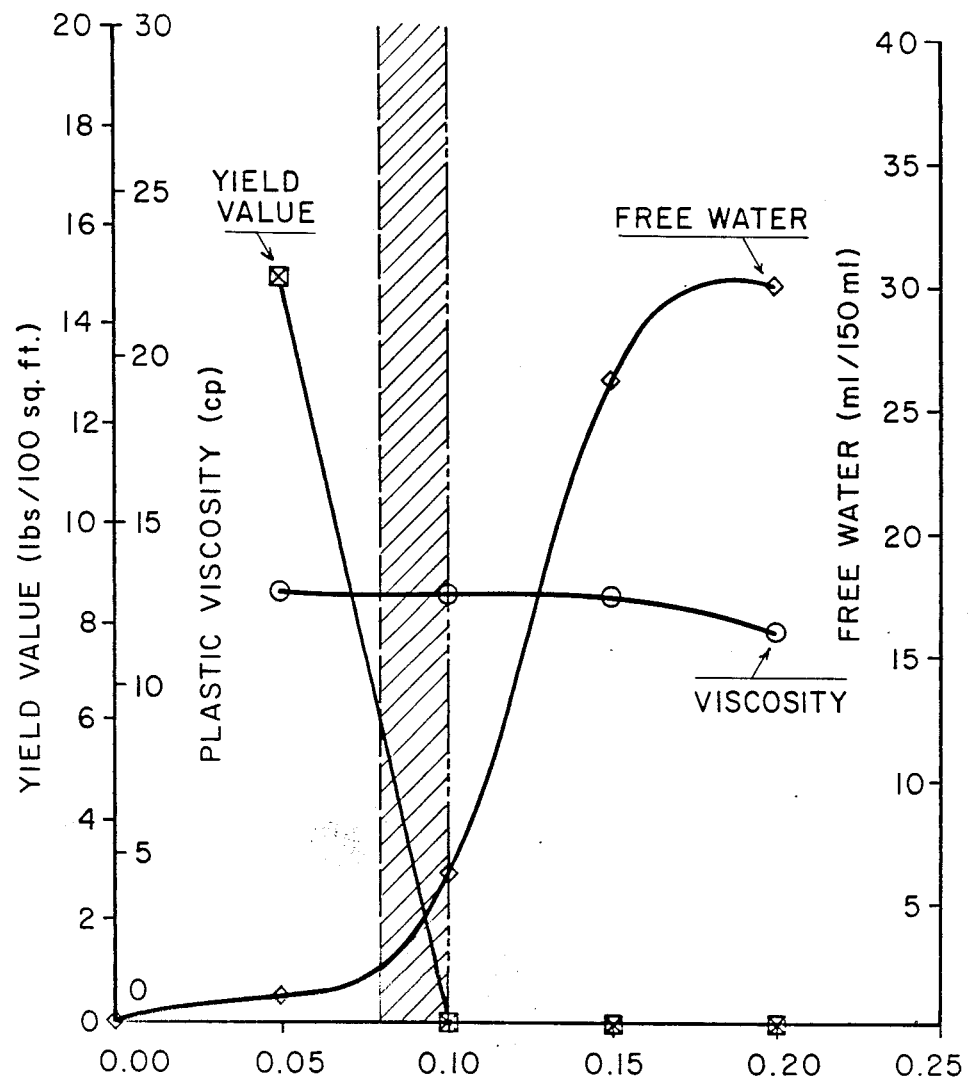

United States Patent [19]

Defosse

[11] Patent Number: 4,778,528
[45] Date of Patent: Oct. 18, 1988

[54] CEMENT SLURRY COMPOSITIONS FOR CEMENTING OIL WELLS, ADAPTED TO CONTROL FREE WATER AND CORRESPONDING CEMENTING PROCESS

[75] Inventor: Camille Defosse, St. Jean Bonnefonds, France

[73] Assignee: Etudes et Fabrication Dowell Schlumberger, France

[21] Appl. No.: 566,198

[22] Filed: Dec. 28, 1983

[30] Foreign Application Priority Data

Jan. 28, 1983 [FR] France ............... 83 01368

[51] Int. Cl.4 .................................. C04B 22/08
[52] U.S. Cl. ........................ 106/89; 106/90; 106/314; 524/6; 166/293
[58] Field of Search ............ 106/89, 314, 90, 315; 166/293; 524/6

[56] References Cited

U.S. PATENT DOCUMENTS

| | | | |
|---|---|---|---|
| 2,806,531 | 9/1957 | Morgan et al. | 166/29 |
| 3,429,724 | 2/1969 | Keenum et al. | 106/89 |
| 3,429,725 | 2/1969 | Keenum et al. | 106/89 |
| 3,847,635 | 11/1974 | Lange et al. | 106/89 |
| 3,993,134 | 11/1976 | Adams | 166/293 |
| 4,011,092 | 3/1977 | Yue | 106/89 |
| 4,424,074 | 1/1984 | Villa et al. | 106/314 |
| 4,441,929 | 4/1984 | Marcellis et al. | 106/314 |
| 4,482,383 | 11/1984 | McKenzie | 106/314 |
| 4,573,534 | 3/1986 | Baker et al. | 106/93 |

FOREIGN PATENT DOCUMENTS 2830528 1/1980 Fed. Rep. of Germany .

Primary Examiner—Steven Capella
Attorney, Agent, or Firm—S. A. Littlefield

[57] ABSTRACT

The invention relates to an additive adapted to suppress free water in conditions of "over-dispersion" of the cement when cementing an oil well. This additive is selected from cerain metal soluble salts such as Mg, Ni, etc. This additive modifies neither the other properties of the slurry (in particular setting time) nor the action of other additives (in particular of retarders).

15 Claims, 3 Drawing Sheets

CEMENT SLURRY COMPOSITIONS FOR CEMENTING OIL WELLS, ADAPTED TO CONTROL FREE WATER AND CORRESPONDING CEMENTING PROCESS

The present invention relates to cement slurry compositions for cementing oils wells, comprising an additive adapted to control free water and/or sedimentation even in so-called "overdispersion" conditions.

The rheological behavior of cement slurries is more or less well described by the so-called Bingham's plastic model. According to said model, the shear stress versus shear rate dependence is a straight line of slope PV (for plastic viscosity) and of initial ordinate YV (for Yield value). A critical property of the slurry resides in the value of plastic viscosity (PV) and the yield value (YV).

To be easily pumpable, a cement slurry should present a plastic viscosity and a yield value as low as possible, and this all the more so if a turbulent flow is desired.

To this effect, it is known to add, in conventional manner, chemical agents named "dispersants" or "plasticizers" to the mix water These agents help decrease the plastic viscosity and yield value of a neat cement slurry (of class G, for example) from 40 cP to 20 cP and from 45 to 0 lbs/100 sqft. respectively.

Another important property of a cement slurry, which is however often overlooked, resides in its capacity to remain homogeneous while left to stand, for the period between the end of pumping and for setting. Very often, a more or less clear supernatant known as "free water" forms atop of the slurry column which is due to bleeding or sedimentation of the cement particles; the part of the annulus opposite the supernatant will not be adequately cemented.

A reason for this phenomenon can be found in the fact that, beyond a given threshold of dispersant concentration, the cement particles are only subjected to repulsive forces. This corresponds to a saturation of the particles surface by the adsorbed molecules of dispersant, the cement particles then acting as elementary entities adapted to sediment in a liquid medium. This state is designated in the present application under the name of "overdispersion".

If on the contrary, the concentration of dispersant does not correspond to saturation, attractive forces remain between the negative-charge areas of a cement particle which have been covered by the dispersant, and the non-covered positive-charge areas of another cement particle, resulting in the formation, inside the liquid phase, of a fragile tridimensional structure, which contributes to keeping the particles in suspension. The pressure which needs to be applied to this structure to destroy it and to set the fluid flowing is the "yield value" (YV). A yield value YV higher than 0 will therefore indicate the presence of such a tridimensional structure in the slurry.

As shown above, the rheology and the free water requirements are in contradiction.

At the moment, only a compromise has been found by a fine adjustment of the dispersant concentration so as to obtain a yield value greater than zero but as low as possible, for example less than 5 lbs/100 sqft.

Although, in practice, it is impossible to reach this compromise because the dispersant concentration range required for the above conditions to be met is extremely narrow. In fact, the dispersant concentration cannot be measured with sufficient accuracy. In addition, the compatibility gap can vary under the effect of virtually uncontrollable factors, such as cement quality, mix water quality, etc.

In short, the passage from the state of "underdispersion" to the state of "overdispersion" corresponds to a variation in the dispersant concentration which is so low that it cannot be measured with sufficient accuracy on site. The use of an excess dispersant is therefore always required and as a result, the conditions of overdispersion likely to lead to the formation of a free water layer are met.

The problem is all the more acute when easily dispersible cements are used, such as Dyckerhoff Class G, and can be aggravated by the use of filtrate reducing agents. Of course, such a drawback is not acceptable in deviated walls.

There is therefore in the oil industry a crucial need for a process which will widen as much as possible the compatibility gap, so that an inaccurate dosing of the dispersant does not substantially affect the yield value. As shown above, the yield value must be as low as possible, i.e. as close to zero as possible, and should not in any case exceed a value close to 5 lbs/100 sqft, while remaining constant over the range of dispersant currently used, which is for example from 0.05-0.02 gal/sk in the case of dispersant referenced DS 80 currently used in oil slurries and which consists of a formaldehyde-sodium sulfonate naphthalene condensate.

It has been discovered according to the present invention that it is possible to create a micro-structure capable of preventing sedimentation and hence the appearance of free water when conditions of "overdispersion" are met.

According to the invention, this microstructure is created by an additive and is therefore not formed from the cement particles themselves, so that overdosing of the dispersant no longer causes sedimentation and consequently no longer leads to the formation of a layer of free water, since the cement particles, even when entirely saturated by molecules of dispersant, are kept in suspension due to the independent microstructure created according to the invention.

This microstructure is created from a precursor consisting of a cation introduced in the form of a soluble salt of magnesium tin, lead, bismuth, or of a transition metal or a combination thereof. It should be noted that the salt must be soluable at a pH close to 7 or less (pH of the mix water) and that the precipitation with formation of a microstructure or microgel takes place upon mixing. Thus, where references made in this Application to such a "soluble" salt, it will be understood that such is referring to solubility in the mix water over such a pH range. Among suitable transition metals may be cited cobalt, nickel, copper, zinc, cadmium, etc.

This additive can be advantageously mixed with the currently used dispersant, thus giving a dispersing composition which will not cause a separation of free water, even in conditions of "overdispersion".

It is presumed that such salts react with the interstitial slurry water as soon as the cement is added to the mix water, and thus form a microstructure of poor resistance.

It is remarkable and important to note that the addition of the additive according to the invention does not modify the thickening time of the slurry, nor the response to retarders or other additives, in particular fluid loss reducing agents.

The invention will be more readily understood on reading the following description with reference to the annexed drawing in which:

FIG. 1 represents the variations of plastic viscosity, yield value YV and free water as a function of the quantity of dispersant, for a Class G cement slurry at 185° F. As can be seen, when YV exceeds the ideal value of 0 lb/100 sqft, the formation of free water increases in an unacceptable manner. FIG. 1 shows the contradictory nature of the rheological parameters of a cement slurry and of the requirements for the formation of free waater, when using conventional techniques. The shaded zone represents the compatibility gap.

Figure 2:
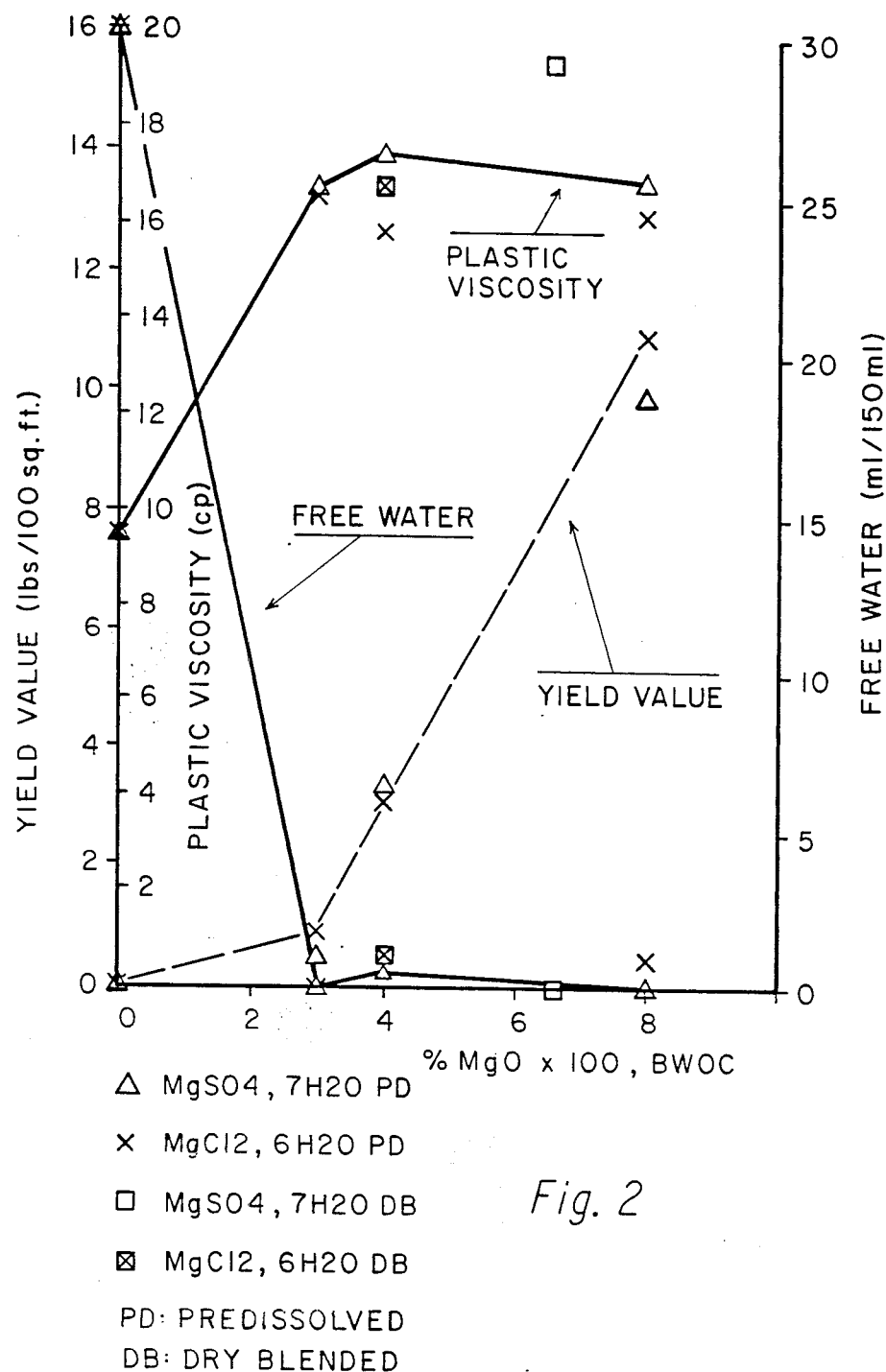

FIG. 2 represents the variation of the same rheological parameters and of the formation of free water in an "easily dispersible" cement slurry, the mix water consisting of deionized water and the slurry being heated to 185° F. after addition according to the invention of a magnesium salt of which the percentage is expressed as "% MgO×100" by weight of cement. (BWOC) The graphs of FIG. 2 have been drawn for a concentration of 0.2 gal/sk of dispersant DS 80.

Figure 3:
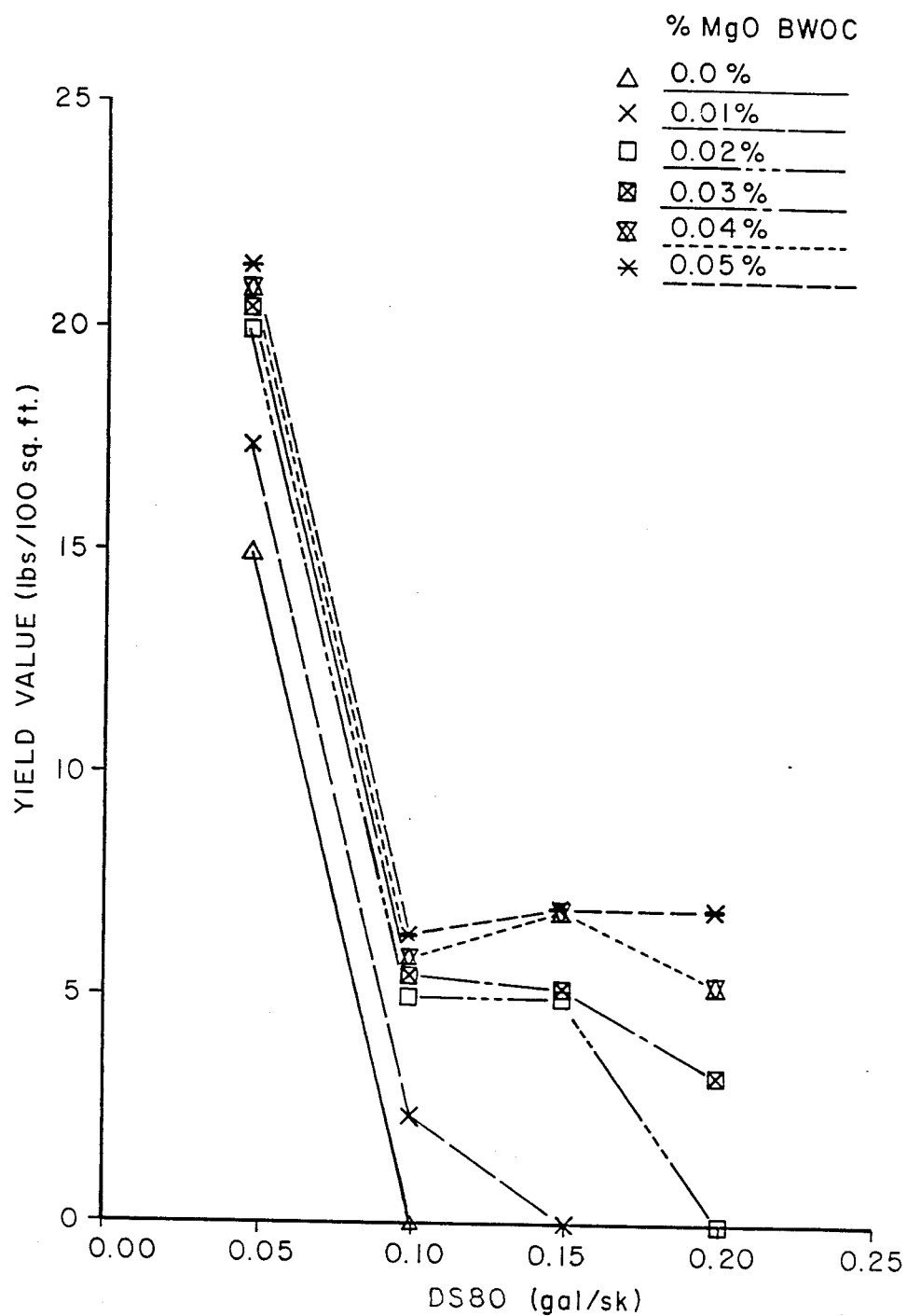

FIG. 3 represents the variation of the yield value as a function of the quantity of conventional dispersant introduced, for various additions of magnesium salt, according to the invention; the slurry used is a cement slurry easily dispersible in deionized water at 185° F. The proportion of magnesium salt added is expressed in % MgO BWOC.

The free water controlling agent according to the invention will be used in the proportion of about 100 micromoles to about 5 millimoles per 100 g of cement, and preferably about 100 micromoles to about 2 millimoles per 100 g of cement.

The following examples are given nonrestrictively to illustrate the invention.

EXAMPLE 1

Magnesium salts and alkaline metal salts

All slurries have been prepared using cements of class G and 0.2 gal/sk of dispersant DS 80 according to the API specification 10.

The magnesium salt used is pre-dissolved in the mix water before addition of the cement; in some cases, however, the magnesium salt is mixed dry with the cement. The plastic viscosity value (PV) and yield value (YV) are calculated by least square regression on the FANN readings at 600, 300, 200 and 100 rpm.

The results are given in Table I hereinafter.

This table shows that a small quantity of magnesium salt as low a 0.03% by weight of cement (expressed as % MgO) suffices to obtain a very low YV value and to totally suppress the formation of free water. This is confirmed by the sedimentation height in the cup of the FANN viscometer when the rheology measurements are completed. This table also shows that neither the nature of the salt used (sulfate, chloride, etc.) nor the way it is introduced (predissolution in the mix water or dry premixing with cement) can affect the results.

It is obvious that magnesium salts are very efficient while sodium sulfate is totally unefficient. It will be noted that the negative value YV observed when no magnesium salt is added is a negative value due to the 600 rpm reading which corresponds to a slurry in turbulent flow because of overdispersion. The actual value that should be considered in this case is zero.

The type of cement used for preparing the slurry has been varied and the results obtained are given in Table II hereinafter. This table shows that with different types of cement, the effect of magnesium on the yield value, and hence on the control of free water for easily dispersible cement-based slurries is identical.

The action of magnesium salts is striking on the attached FIG. 2 which represents the relationship between the suppression of free water and the increase in the value of YV.

FIG. 3 can be compared to FIGS. 1 and 2. FIG. 3 shows that it is possible, by addition of a magnesium salt, to keep constant or substantially constant the value of YV for magnesium salt concentrations expressed as % MgO by weight of cement greater than about 0.01% MgO or preferably greater than 0.02% MgO.

EXAMPLE 2

Transition metal and other salts and comparison with magnesium salts

Various tests have been carried out with easily soluble salts of transition metals and some other metals. The results are given in Table III hereinafter. This leads to the conclusion that except for iron, all transition metal salts tested and the other metal salts in Table III, are efficient for the reduction of free water.

Salts from zinc, tin and nickel have then been more thoroughly compared. The results are given in Table IV hereinafter. The three metals in question give virtually the same improvement where control of free water is concerned, but it is clearly visible that nickel increases the yield value to a lesser extent, followed by Mg, Sn and Zn in this order. Tests conducted at 80° F. with magnesium salts and nickel salts have given comparable results for the same concentration range.

EXAMPLE 3

Influence of the additives according to the invention on the other properties of the slurry It is particularly important to note that the thickening time of the slurry is not modified by the presence of the free water controlling agents according to the invention. This also applies where response of the slurry to retarders is concerned. This is shown in Table V hereinafter which gives the results obtained with typical slurry compositions comprising a dispersant, a retarder, and an anti-foaming agent. The addition of a fluid loss reducing agent of the polyamine or polyethylenimine type does not modify the results obtained when using magnesium as precursor of the microgel. The foregoing applies to all types of retarders, and particularly to retarders of the lignosulfonate or glucoheptonate type which are commonly used in slurries for cementing oil wells.

Conversely, Table VI hereinafter shows that the additive according to the invention keeps its favorable properties on the control of free water and presents the same action as regards the yield value, even in the presence of retarders.

Finally, Table VII hereinafter shows that the influence of the additives according to the invention on the compression strength is rather beneficial, at the concentration used.

TABLE I

Tests conducted at 185° F. with tropical type Dyckerhoff Class G cement, fresh water and 0.2 gal/sk DS 80.
Mixing conditions of the Mg salt:
1. predissolved in mix water   2. dry mixed with cement mixture.

| magnesium salt | | | | results | | |
|---|---|---|---|---|---|---|
| | | | free | rheology | | |
| form | % MgO BWOC | mixing conditions | water ml/150 ml | PV cP | YV lbs/ 100 sq ft | sedimentation in the cup (mm) |
| MgSO$_4$.7H$_2$O | 0 | — | 30 | 9.5 | 0 | 20 |
| | 0.03 | 1 | 0 | 16.8 | 0.5 | 0.5 |
| | 0.04 | 1 | 0.5 | 17.5 | 3.4 | 1.0 |
| | 0.08 | 1 | 0 | 17.0 | 10.0 | 0.5 |
| MgCl$_2$.6H$_2$O | 0.03 | 1 | 0 | 16.6 | 0.9 | 0.5 |
| | 0.04 | 1 | 1 | 15.9 | 3.1 | — |
| | 0.08 | 1 | 1 | 16.3 | 11.0 | 0.5 |
| MgSO$_4$.7H$_2$O | 0.066 | 2 | 0 | 19.4 | 12.2 | 1.0 |
| MgCl$_2$.6H$_2$O | 0.04 | 2 | 1 | 12.8 | 1.8 | 1.0 |
| Na$_2$SO$_4$ | 0.10 to 0.50 | 1 and 2 | 30 to 35 | 12 to 13 | <0** | 25 to 30 |

PV = Plastic viscosity
YV = Yield value
**Actual value to consider = 0

TABLE II

Tests conducted at 185° F. using deionized water and 0.2 gal/sk DS 80.

| Cement brand | % MgO BWOC | rheology | | free water (ml/150 ml) |
|---|---|---|---|---|
| | | P.V. (cP) | Y.V. lbs/100 sq ft | |
| "Cemoil" Classe G | 0 | 14.2 | 3.6 | 0 |
| | 0.04 | 16.8 | 12.6 | 1 |
| | 0.08 | 13.8 | 31.0 | 0 |
| "Italcementi" (factory Scala di Giocca) Class G | 0 | 13.5 | −1.4** | 30 |
| | 0.04 | 17.2 | 1.18 | 2 |
| | 0.08 | 18.3 | 7.5 | 1.5 |
| "Italcementi" (factory Trieste) Class G | 0 | 12.3 | 0.31 | 2 |
| | 0.04 | 18.3 | 12.1 | 1.5 |

P.V. = Plastic viscosity
Y.V. = Yield value
**Actual value to consider = zero

TABLE III

Tests conducted at 185° F. with deionized water, tropical type Dyckerhoff class G cement, and 0.2 gal/sk DS 80.

| metal | salt | % BWOC | Rheology | | Sedimentation in the cup (mm) | Free water ml/150 ml |
|---|---|---|---|---|---|---|
| | | | P.V. (cP) | YV lbs/100 sq ft | | |
| Cd | CdCl$_2$ | 0.18 | 18 | 1 | 1.5 | 1 |
| Co | CoCl$_2$.6H$_2$O | 0.25 | 19.4 | 4.4 | 1.5 | 1 |
| Cr | CrCl$_3$.6H$_2$O | 0.28 | 14.5 | −3** | 18 | 22 |
| Cu | CuCl$_2$.2H$_2$O | 0.08 | 22 | −4.4** | 1 | 20 |
| Fe* | Fe$_2$(SO$_4$)$_3$ | 0.19 | 15.2 | −1.72** | 22 | 20 |
| Hg* | HgCl$_2$ | 0.27 | 13.6 | 2.0 | 1 | 2 |
| Ni | NiCl$_2$.6H$_2$O | 0.24 | 15.7 | 2.78 | 1 | 2 |
| Sn(IV)* | SnCl$_4$.5H$_2$O | 0.34 | 15.7 | 8.25 | 1 | 2 |
| Sn(II) | SnCl$_2$ | 0.18 | 17.5 | 13.5 | 2 | 3 |
| Zn | ZnSO$_4$.7H$_2$O | 0.29 | 15.3 | 2.44 | 2 | 0 |
| Zn | ZnCl$_2$ | 0.13 | 18.4 | 1.53 | 1 | 0 |
| Bi | Bi(NO$_3$)$_3$ | 0.48 | 12.7 | −2.4** | 20 | 0 |
| Pb | Pb(NO$_3$)$_2$ | 0.31 | 15.5 | −2.86** | 30 | 5 |

*+6 ml HCl 1N in the mix water to dissolve the salt
P.V. = plastic viscosity
Y.V. = yield value
**actual value to consider: zero

TABLE IV

Tests with metals other than Mg. Tests conducted at 185° F. with tropical type Dyckerhoff Class G cement and deionized water.

| metal | salt | % BWOC | % equivalent MgO | DS 80 | P.V. cP | YV lbs/ 100 ft$^2$ | sedimentation in the cup mm | free water ml/150 ml |
|---|---|---|---|---|---|---|---|---|
| Zn | ZnSO$_4$.7H$_2$O | 0.29 | 0.04 | 0.2 | 15.3 | 2.44 | 2 | 0 |
| | | | | 0.1 | 30 | 110 | 1 | — |
| | | 0.15 | 0.02 | 0.2 | 15.3 | −2.0** | 8 | 2 |
| | | | | 0.1 | 14.7 | 16.9 | 1 | 3 |
| Sn* | SnCl$_4$.5H$_2$O | 0.34 | 0.04 | 0.2 | 15.7 | 8.25 | 1 | 2 |
| | | | | 0.1 | 21.9 | 39.7 | 1 | 0 |
| | | 0.15 | 0.018 | 0.1 | 17.4 | 27.9 | 1 | 4 |
| | | | | 0.2 | 15.5 | 2.08 | 1 | 4 |

TABLE IV-continued

Tests with metals other than Mg. Tests conducted at 185° F. with tropical type Dyckerhoff Class G cement and deionized water.

| metal | salt | % BWOC | % equivalent MgO | DS 80 | P.V. cP | YV lbs/ 100 ft² | sedimentation in the cup mm | free water ml/150 ml |
|---|---|---|---|---|---|---|---|---|
| Ni | NiCl₂.6H₂O | 0.24 | 0.04 | 0.2 | 15.7 | 2.78 | 1 | 0 |
|  |  |  |  | 0.1 | 16.9 | 12.4 | 1 | 0 |
|  |  | 0.12 | 0.02 | 0.2 | 16.3 | −1.11** | 2 | 3 |
|  |  |  |  | 0.1 | 16.3 | 2.63 | 1 | 1 |

*5 ml HCl in mix water
**actual value to consider: zero
P.V. = plastic viscosity
Y.V. = yield value

TABLE V

Thickening time for a slurry containing tropical type Dyckerhoff Class G cement, 0.2 gal/sk DS 80., fresh water and MgSO₄.7H₂O predissolved in mix water, by weight of cement expressed in MgO.

| MgO (% by weight of cement) | Retarder (% by weight of cement) | Thickening time (hr/min.) |
|---|---|---|
| 0 | — | 1:30 |
| 0.06 | — | 1:50 |
| 0.08 | — | 1:30 |
| 0.06 | D 800* 0.1 | 3:20 |
| 0.06 | D 28** 0.1 | 6:00 (no setting) |

*of the modified lignosulfonate type: retarder for average temperatures.
**containing sugar derivatives: retarder for high temperatures.

TABLE VI

Influence of retarders on the action of the additive according to the invention. Same conditions as in Table I. MgSO₄.7H₂O predissolved in mix water in a proportion of 0.04% by weight of cement.

| Retarder (% with respect to cement weight) | Rheology PV (cP) | YV | Free water (ml/150 ml) |
|---|---|---|---|
| D 800 0.2% | 17.9 | 3.4 | 1 |
| D 109 0.5 gal/sk | 16.6 | 1.6 | 0 |

PV = plastic viscosity
YV = yield value
D 800: retarder of the modified lignosulfonate type for average temperatures
D 109: retarder containing sugar derivatives; for high temperatures.

TABLE VII

Compressive strength after hardening for 24 hrs at 185° F. - Slurry containing tropical type Dyckerhoff Class G cement, fresh water, 0.2 gal/sk DS 80 and MgSO₄.7H₂O predissolved mix water.

| MgO % BWOC | Average of 3 measurements |
|---|---|
| 0 | 4562 |
| 0.04 | 5625 |
| 0.08 | 6157 |
| 0.15 | 9879 |

What is claimed is:

1. In a cement slurry composition useful for cementing oil wells and comprising cement, water and dispersant, a column of which composition would otherwise form a free water layer, the improvement which comprises the inclusion therein of an agent adapted to control free water, said free water controlling agent being about 100 micromoles to 5 millimoles per 100 grams of cement of a soluble salt of magnesisum, tin, lead, bismuth or a transition metal or a combination thereof.

2. Composition as claimed in claim 1, wherein the concentration of said free water controlling agent is between 100 micromoles and 2 millimoles per 100 g of cement.

3. Compositions as claimed in claim 1 or 2, wherein the said agent consists of a soluble Mg, or Cd, Co, Cr, Cu, Hg, Ni, Sn, Zn, Bi, Pb salt or a combination thereof.

4. Composition as claimed in claim 1 wherein said agent is selected from
MgSO₄.7H₂O
MgCl₂.6H₂O
CdCl₂
CoCl₂.6H₂O
HgCl₂
NiCl₂.6H₂O
SnCl₄.5H₂O
SnCl₂
ZnSO₄.7H₂O
ZnCl₂
Bi(NO₃)₃
Pb(NO₃)₂.

5. Composition as claimed in claim 1 or 2, wherein said agent is a soluble magnesium salt, a soluble nicket salt or combination thereof.

6. Composition as claimed in claim 5, wherein said magnesium salt is at least one of MgSO₄.7H₂O and MgCl₂ and said nickel salt is NiCl₂.6H₂O.

7. Composition as claimed in claim 1 containing a lignosulfonate or glucoheptonate retarder.

8. Composition as claimed in claim 6 containing a lignosulfonate or glucoheptonate retarder.

9. In a process of cementing the annulus of an oil well with a cement slurry composition, the improvement which comprises employing the cement slurry composition of claim 1 as said cement slurry.

10. Process according to claim 9 in which said free water controlling agent is introduced by pre-disolution in the mix water, premixing with the cement or premixing with the dispersant.

11. A composition adapted to control free water in a cement slurry composition useful for oil well cementing consisting essentially of a sulfonated dispersant and a free water controlling agent which is a soluble salt of magnesium, tin, lead, bismuth or a transition metal other than Zn, or combination thereof.

12. A composition according to claim 11 in which the free water controlling agent is a soluble magnesium salt or a soluble nickel salt.

13. A composition as claimed in claim 11, wherein said agent is a soluble salt of Mg, Cd, Co, Cr, Cu, Hg, Ni, Sn, Bi or Pb, or a combination thereof.

14. In a process of cementing of the annulus of an oil well with a cement slurry composition, the improvement which comprises employing the cement slurry composition of claim 13 as said cement slurry.

15. A composition as claimed in claim 1, wherein said agent is a soluble salt of Mg, Cd, Co, Cr, Cu, Hg, Ni, Sn, Bi or Pb, or a combination thereof.

* * * * *